US011999017B2

(12) United States Patent
Lessmueller et al.

(10) Patent No.: US 11,999,017 B2
(45) Date of Patent: Jun. 4, 2024

(54) METHOD AND DEVICE FOR CONDUCTING AND MONITORING A MACHINING PROCESS OF A WORKPIECE

(71) Applicant: Lessmüller Lasertechnik GmbH, Munich (DE)

(72) Inventors: Eckhard Lessmueller, Munich (DE); Christian Truckenbrodt, Munich (DE); Maximilian Schmidt, Ampermoching (DE)

(73) Assignee: Lessmüller Lasertechnik GmbH, Munich (DE)

( * ) Notice: Subject to any disclaimer, the term of this patent is extended or adjusted under 35 U.S.C. 154(b) by 560 days.

(21) Appl. No.: 17/162,782

(22) Filed: Jan. 29, 2021

(65) Prior Publication Data

US 2021/0237208 A1  Aug. 5, 2021

(30) Foreign Application Priority Data

Jan. 30, 2020 (DE) ..................... 10 2020 000 630.2

(51) Int. Cl.
*B23K 26/70* (2014.01)
*B23K 26/06* (2014.01)
*B23K 26/28* (2014.01)

(52) U.S. Cl.
CPC ........ *B23K 26/705* (2015.10); *B23K 26/0643* (2013.01); *B23K 26/0648* (2013.01); *B23K 26/28* (2013.01)

(58) Field of Classification Search
CPC .... B23K 26/032; B23K 26/03; B23K 26/082; B23K 26/044; B23K 26/21; B23K 31/125;
(Continued)

(56) References Cited

U.S. PATENT DOCUMENTS

| 2015/0338210 A1* | 11/2015 | Lessmüller | B23K 26/032 |
| | | | 250/492.1 |
| 2016/0039045 A1* | 2/2016 | Webster | G01B 9/02091 |
| | | | 356/450 |
| 2019/0126388 A1* | 5/2019 | Lessmueller | G01B 11/10 |

FOREIGN PATENT DOCUMENTS

| DE | 10006852 A1 | 8/2001 |
| DE | 102011103282 A1 | 12/2012 |

(Continued)

OTHER PUBLICATIONS

English translation of DE-102015012565-B3 (Year: 2016).*
(Continued)

*Primary Examiner* — Chris Q Liu
(74) *Attorney, Agent, or Firm* — Bradley Arant Boult Cummings LLP; Henry B. Ward, III

(57) ABSTRACT

The invention relates to a method for conducting and monitoring a machining process of a workpiece (10), in particular a welding process for joining the workpiece (10) to a further workpiece (10), by means of a high-energy machining beam (14), wherein the method comprises the following steps: generating a high-energy machining beam (14); projecting and/or focusing the machining beam (14) onto the workpiece (10), wherein, in accordance with a machining control signal, different machining regions of the workpiece (10) are machined; generating a measurement beam (16) by means of an optical coherence tomograph (18), wherein the measurement beam (16) is able to be coupled into the machining beam (14); determining measurement points (20) during the machining process by means of the optical coherence tomograph (18) using the measurement beam (16), in accordance with a measurement control signal; obtaining at least one external signal which is based on a measured variable and which is independent of a processing of the machining control signal and of the measurement
(Continued)

control signal; generating an evaluation on the basis of the measurement points (20) and of the at least one external signal, which evaluation comprises a comparison of the measurement points (20) with at least one threshold value; monitoring the machining process on the basis of the evaluation.

The invention relates further to a correspondingly configured device for conducting and monitoring a machining process of a workpiece (10).

22 Claims, 4 Drawing Sheets

(58) Field of Classification Search
CPC ............. B23K 26/046; B23K 26/0344; B23K 26/042; B23K 26/048; B23K 26/0643; B23K 26/147; B23K 26/211; B23K 10/02; B23K 15/0046; B23K 26/034; B23K 26/037; B23K 26/04; B23K 26/0648; B23K 26/0665; B23K 26/0884; B23K 26/14; B23K 26/144; B23K 26/1462; B23K 26/1476; B23K 26/22; B23K 26/242; B23K 26/244; B23K 26/26; B23K 26/28; B23K 26/342; B23K 26/707; B23K 31/12; B23K 9/00
USPC .................................................... 219/121.83
See application file for complete search history.

(56) References Cited

FOREIGN PATENT DOCUMENTS

| | | | |
|---|---|---|---|
| DE | 102013008269 | A1 | 11/2014 |
| DE | 102013017795 | B3 | 2/2015 |
| DE | 102013015656 | A1 | 3/2015 |
| DE | 102013226961 | A1 | 6/2015 |
| DE | 102014008265 | B3 | 9/2015 |
| DE | 102014108426 | A1 | 12/2015 |
| DE | 102015012565 | B3 * | 10/2016 |
| DE | 102015007142 | A1 | 12/2016 |
| DE | 102015015330 | A1 | 6/2017 |
| DE | 102017010108 | A1 | 5/2019 |
| WO | 2018178387 | A1 | 10/2018 |

OTHER PUBLICATIONS

"Inline monitoring of laser processing: new industrial results with the low coherence interferometry sensor approach," Kogel-Hollacher et al., High-Power Laser Materials Processing: Lasers, Beam Delivery, Diagnostics, and Applications V, Proc. Vol. 9741, Mar. 18, 2016 (doi: 10.1117/12.2208004).

"Real time monitoring of laser beam welding keyhole depth by laser interferometry," J.J. Blecher et al., Science and Technology of Welding and Joining, vol. 19, No. 7, Jan. 10, 2014, p. 560-564.(doi: 10.1179/1362171814Y.0000000225).

Examination Report issued by the German Patent Office for German Patent Application No. 102020000630.2, dated Nov. 11, 2020.

* cited by examiner

METHOD AND DEVICE FOR CONDUCTING AND MONITORING A MACHINING PROCESS OF A WORKPIECE

The invention relates to a method and to a device for conducting and monitoring a machining process of a workpiece.

Devices for machining a workpiece with a high-energy machining beam are known from the prior art and are used, for example, in laser material machining processes. A high-energy machining beam in the form of a laser machining beam is thereby used to act on one or more workpieces or workpiece parts, for example in order to weld them together in the region of a lap joint, a seam and/or a joint edge.

In corresponding machining systems, an optical coherence tomograph (OCT) is often used, by means of which there can be generated a measurement beam which is able to be coupled into the machining beam optics. The machining processes can thereby be monitored three-dimensionally by using the coherence tomograph in addition to conventional two-dimensional monitoring by means of cameras or the like, in order to permit a depth measurement during the machining process.

As is described in DE 10 2015 007 142 A1, the OCT measurement beam, for mapping a weld seam, can be guided over the weld seam at different positions along a line. Once machining is complete, a height profile can thereby be obtained.

For interpreting the OCT measured data, a target range can be defined, within which the determined profile lies provided that the weld seam is free of defects. Such a target range is often determined by evaluating the profile in its edge regions, that is to say at points on the welded workpieces that are remote from the weld seam.

There are further known from the prior art tactile welding optics. These have a wire feed which feeds a welding wire in the region of the point of impingement of the machining beam. Such a device, by means of which a welding wire tip is guided in a force-fitting manner along a workpiece surface, is known, for example, from DE 100 06 852 A1.

Such systems are often monitored by means of a camera. For example, according to DE 10 2013 226 961 A1, image data obtained by means of such a camera can be used for computer-assisted process monitoring.

A further camera-based monitoring device is known from DE 10 2013 017 795 B3.

OCT monitoring by means of the above-described target range can fail here because the welding wire and thus also the molten welding material often lie beneath the level of the surfaces of the welded workpieces. The surfaces of the workpieces therefore cannot provide a reliable reference for determining the target range.

Depending on the machining process that is conducted, precise consideration of an OCT depth profile can further be helpful for process monitoring. In the article "Inline monitoring of laser processing: new industrial results with the low coherence interferometry sensor approach" by Kogel-Hollacher et al. (doi: 10.1117/12.2208004), it is proposed to detect a gap between machined workpieces on the basis of a real-time OCT measurement. An OCT depth measurement is thereby performed during the welding process.

As is described in the article "Real time monitoring of laser beam welding keyhole depth by laser interferometry" by J. J. Blecher et al. (doi: 10.1179/1362171814Y.0000000225), an OCT measurement can additionally be used to observe the formation of a so-called keyhole in real time, that is to say of a channel that forms in the molten material during laser machining.

From DE 10 2013 015 656 A1 there is known a method which allows the penetration depth of a laser beam into a workpiece to be measured using an optical coherence tomograph. A distance between a reference point and a workpiece surface is thereby determined by means of a first measurement beam, while a second measurement beam is guided into the keyhole (vapor capillary) of the current welding point. Measurement with the second measurement beam allows a distance between the reference point and a measurement point within the keyhole to be determined. The penetration depth of the laser beam is derived from the determined distances.

In order to obtain real-time OCT data, it is necessary to know the time point in the machining process to which a specific measured value is to be allocated. This allocation is conventionally achieved in that a control unit transmits control commands at a specific time point both to the optical coherence tomograph and to a machining laser. The measured data obtained can then be allocated to the time point of transmission of the commands.

In practice, a temporal jitter can thereby occur, that is to say an accuracy fluctuation in the signal, for example as a result of different clock rates in the processing of the commands for different devices or as a result of different data transmission rates to the devices. The temporal allocation can therefore be subject to a temporal error which affects the interpretation of the measured data, since the order of magnitude of the jitter is close to the order of magnitude of the time taken to form a keyhole.

Starting from this prior art, the object underlying the present invention is to permit reliable and accurate monitoring of a machining process.

This object is achieved according to the invention by a method having the features of claim 1 and by a device having the features of claim 12. Further developments of the invention are to be found in the dependent claims.

According to the invention there is provided a method for conducting and monitoring a machining process of a workpiece, in particular a welding process for joining the workpiece to a further workpiece, by means of a high-energy machining beam, wherein the method comprises the following steps:

generating a high-energy machining beam;
projecting and/or focusing the machining beam onto the workpiece, wherein, in accordance with a machining control signal, different machining regions of the workpiece are machined;
generating a measurement beam by means of an optical coherence tomograph, wherein the measurement beam is able to be coupled into the machining beam;
determining measurement points during the machining process by means of the optical coherence tomograph using the measurement beam, in accordance with a measurement control signal;
obtaining at least one external signal which is based on a measured variable and which is independent of a processing of the machining control signal and of the measurement control signal;
generating an evaluation on the basis of the measurement points and of the at least one external signal, which evaluation comprises a comparison of the measurement points with at least one threshold value;
monitoring the machining process on the basis of the evaluation.

There is further provided a device for conducting and monitoring a machining process of a workpiece, in particular a welding process for joining the workpiece to a further workpiece, by means of a high-energy machining beam, wherein the device comprises:

a machining unit having a machining beam source for generating the high-energy machining beam and having machining beam optics for projecting and/or focusing the machining beam onto the workpiece, wherein, in accordance with a machining control signal, different machining regions of the workpiece are able to be machined;

an optical coherence tomograph for generating a measurement beam, wherein the measurement beam is able to be coupled into the machining beam; and a control unit, which is adapted to:

determine measurement points during the machining process by means of the optical coherence tomograph using the measurement beam, in accordance with a measurement control signal;

obtain at least one external signal which is based on a measured variable and which is independent of a processing of the machining control signal and of the measurement control signal;

generate an evaluation on the basis of the measurement points and of the at least one external signal, which evaluation comprises a comparison of the measurement points with at least one threshold value;

monitor the machining process on the basis of the evaluation.

According to the invention, a high degree of accuracy of process monitoring can be achieved. In addition, a high degree of reliability of process monitoring can be achieved. By the use of an external signal based on a measured variable, a threshold value for the process monitoring can be determined accurately and reliably.

The method according to the invention can be conducted with the device according to the invention. In particular, the device is adapted to conduct the method semi-automatically or automatically. Where reference is made hereinbelow to method steps, it will be understood that the control unit can correspondingly be adapted to implement the described steps. In addition, it will be understood that the method can be conducted with a system which optionally comprises further components, as are described hereinbelow for some variants of the invention.

There can further be provided a deflection device, by means of which the measurement beam is able to be deflected in such a manner that it is able to be guided on the workpiece within a region close to a point of impingement of the machining beam. The measurement beam can thereby be able to be guided, for example, into a keyhole that forms during machining and/or directly onto the point of impingement of the machining beam on the workpiece. Typically, a penetration depth in the keyhole is measured by directing the measurement beam into the keyhole. In addition, the measurement beam can be guided in front of or behind the point of impingement in the machining direction and/or transversely to the machining direction. It is thereby possible to travel on lines along which, for example, a height profile is to be determined.

The external signal can be independent of the processing of the machining control signal and of the measurement control signal in that it is not numerically obtained from those signals. In particular, the external signal is not a signal generated by the control unit. The external signal can be correlated with the machining control signal and/or the measurement control signal and relate in particular to one or more specific machining points. However, the external signal is dependent as a measured variable on a physical operation. The external signal is therefore typically not merely to be ascribed to specifications of a control program. In particular, the external signal cannot be ascribed wholly deterministically to the machining control signal and the measurement control signal.

The generation of the evaluation comprises in particular a numerical consideration of a value of the external signal. The threshold value can be based, for example, on the actual value of the external signal and in particular not merely on the sign thereof and/or in particular not merely on a comparison of the value of the external signal with another value.

The monitoring of the machining process can comprise the reproduction of the evaluation. Furthermore, the monitoring can comprise the control and/or regulation of at least one process parameter on the basis of the evaluation. The process parameter can be, for example, a machining power and/or a feed speed and/or a position of a point of impingement of the machining beam on the workpiece.

According to the invention, machining beam optics can be provided, for example in a machining head. The machining beam can be a laser machining beam. The measurement beam is in particular a laser beam which is able to be generated independently of the processing beam. The measurement beam can be capable of being coupled into the machining beam optics. The device according to the invention can comprise a movable machining head which, for example, can be carried by an industrial robot and movable relative to the workpiece to be machined. The machining beam optics can thereby be arranged in a movable machining head. Alternatively or in addition, the workpiece can also be movable relative to the machining head.

The reference arm can be configured so as to be unchangeable or adjustable. For example, optical properties of the reference arm, such as the optical path length thereof and/or the total dispersion thereof, can be adjustable, for example in order to adapt them to a changed path length of the machining beam and/or to different deflection devices for the measurement beam. In addition, it can be provided according to the invention that a plurality of reference arms which are able to be operated in parallel, alternately and/or in series is provided, which reference arms differ in terms of their optical properties. It can accordingly be made possible, for example in the case of a change of optical components of the beam guidance, that a switch is made manually or automatically to a different reference arm in order to effect optical correspondence of the reference arm and the measurement arm.

The optical coherence tomograph is usually not arranged on the industrial robot. It is then connected to the machining head in a stationary manner and via light guides such as, for example, fibers. The machining head is therefore movable relative to the coherence tomograph. However, it can also be provided according to the invention that the optical coherence tomograph, and in particular the sensor system thereof, is arranged on the industrial robot, for example within and/or close to the machining head. The coherence tomograph can then be movable together with the machining head and/or with moving components of the industrial robot. The inventors have recognized that the use of swept-source systems is appropriate for this purpose, since such systems have free-space optics with low sensitivity.

The optical coherence tomograph can comprise a beam-generating unit for generating the measurement beam and also a reference beam. The optical coherence tomograph can further have a measurement arm, which extends starting from the beam-generating unit and in which the measurement beam is able to be optically guided so that it is able to be projected onto a measuring object, and a reference arm, which extends starting from the beam-generating unit and in which the reference beam is able to be optically guided and which replicates the measurement arm at least in terms of its optical path length and/or in terms of its other optical properties, so that the measurement beam and the reference beam, after passing through the measurement arm or the reference arm, respectively, can be superposed in order to generate an interference signal.

The measurement beam typically has a power of approximately 5 mW and is therefore subject to laser safety class 3B. An interlock can therefore be provided according to the invention, by means of which an interlock signal is generated. The interlock signal can effect switching off of the beam-generating unit, so that the measurement beam is switched off as soon as a user accesses the beam-generating unit. Alternatively, it can also be provided that the power is reduced in that case, so that set-up work can be carried out on the system on the basis of a measurement beam that is acceptable in terms of safety.

According to a further development of the invention, the at least one external signal can comprise output values of at least one sensor. The sensor can be adapted to acquire state variables and/or measured values which are dependent on an actual state of the workpiece or workpieces and/or of the machining process. It is thereby possible purposively to obtain an external signal which provides information lying outside a control program in addition to OCT measured data. On the basis of this additional information, OCT measured data can be interpreted more accurately.

It can additionally be provided that a wire which is able to be melted by means of the machining beam during the machining is fed in the machining region, and wherein the at least one sensor is adapted to detect a pose of the wire relative to the workpiece. The device can have a wire feed for this purpose. In particular, the device in this case comprises tactile welding optics. Detection of the pose of the wire can comprise a detection of a position and/or orientation of the wire. The sensor can thereby be a combination of different individual sensors. The sensor is advantageously adapted to detect the pose of the wire for different machining positions in a machining direction. Knowledge of the pose of the wire can be taken into consideration in the evaluation, whereby an interpretation of the OCT measured data is more accurate and monitoring based thereon is more reliable and more robust.

The pose of the wire can be determined particularly accurately when the at least one sensor comprises a force sensor for detecting a force acting on the wire and/or a height sensor for detecting a height position of the wire. The force acting on the wire can be a laterally acting force and/or a longitudinally acting force and/or a twisting force. The force sensor can comprise, for example, a plurality of individual force sensors for acquiring different force components. The height sensor is adapted, for example, to determine a position of the wire and/or of the wire feed relative to a fixed point, for example relative to the machining beam optics. In particular, the height sensor is adapted to detect a vertical movement of the wire feed. The height sensor can likewise be in the form of a force sensor which determines, for example, a force with which the wire is pressed onto the workpiece. If the wire feed is configured so as to be subjected to pressure by a spring element, it is possible, for example, to derive a compression and/or extension of the spring element from the force.

It can further be provided that a weld seam is formed by means of the machining beam, wherein the measurement points map a height profile of the weld seam after the formation thereof. The height profile can be obtained behind a current point of impingement of the machining beam in the machining direction. The height profile is preferably obtained in a direction transverse to a machining direction and/or transverse to a longitudinal direction of the weld seam by lateral deflection of the measurement beam. By using an external signal for the evaluation of the measured data, an accurate height profile can thus be determined in a manner that has little susceptibility to errors. In this connection, reference is made to the relevant disclosure in DE 10 2015 007 142 A1.

Specifically for the case of a tactile welding optic, evaluation errors due to an actual pose of a weld seam can effectively be avoided in particular when, on the basis of the output values of the at least one sensor, an upper and/or a lower threshold for the height profile is determined as the at least one threshold value. The monitoring can thereby comprise a comparison of the height profile with the upper and/or with the lower threshold. A target range for the height profile can be defined by the upper and/or the lower threshold. The target range can be dependent on the actual pose of the wire. As a result, the limit values of a target range for an OCT height profile can be determined simply and accurately, which inter alia makes possible automated monitoring of a tactile welding operation by means of an OCT measurement.

It can additionally be provided according to the invention that the evaluation comprises, alternatively or in addition, a consideration of a current penetration depth of the machining beam into the workpiece. The penetration depth can be determined, for example, while the process is being carried out, by directing the measurement beam at a keyhole generated by the machining beam.

According to a further development of the invention it can further be provided that the at least one threshold value comprises an envelope curve, wherein the monitoring comprises a comparison of the measurement points with the envelope curve. An envelope curve can be used which defines the above-mentioned target range. Alternatively or in addition, an envelope curve can be used by means of which a variation with time of the penetration depth can be determined and/or monitored.

In some embodiments of the invention it is provided that the machining beam is generated by means of a machining laser, wherein the at least one external signal comprises an analog feedback signal of the machining laser. The external signal can be, for example, the output signal of an integrated photodiode of the machining laser. The analog feedback signal is advantageously directly dependent on an actual start of emission of the machining beam. It is thereby possible to prevent a temporal jitter between the measurement control signal and the machining control signal from affecting a penetration depth measurement. In addition, an external signal that is present can thereby be used in a simple and reliable manner for implementing the allocation according to the invention of measurement points to machining time points.

It can further be provided that the machining beam is projected and/or focused by means of a machining beam optic, wherein the at least one external signal comprises an output signal of a photodiode which determines a power of the machining beam in a region of the machining beam optics. Advantageously, in accordance with the output signal of the photodiode which determines a power value of the machining beam, the time point from which power of the machining beam is present is determined. A direct temporal relationship between the external signal and a time point of the actual presence of machining beam power is thereby obtained, so that the resulting allocation of measurement points to machining time points is not impaired by a jitter between the measurement control signal and the machining control signal on a penetration depth measurement. The photodiode which determines a power of the machining beam in the region of the machining beam optics can be arranged, for example, behind a semi-reflecting mirror of the machining beam optics. The photodiode which determines a power of the machining beam in a region of the machining beam optics can be adapted to detect light coming from the machining beam source. The output signal of the photodiode which determines a power of the machining beam in a region of the machining beam optics can thereby be used to determine an actual time point of an impingement of the machining beam on the machining beam optics. In particular, the external signal is directly dependent on this actual time point.

An accurate temporal allocation in respect of a current coupling of power into the workpiece to be machined can be achieved in particular when the at least one external signal comprises an output signal of a photodiode which determines a power value of a reflected portion of the machining beam. According to a further development, in accordance with the output signal of the photodiode which determines a power value of a reflected portion of the machining beam, the time point from which power of the machining beam is coupled into the workpiece is determined. The photodiode which determines a power value of a reflected portion of the machining beam can be arranged, for example, behind the deflection device for the measurement beam, wherein said deflection device is advantageously partially transmitting, so that a portion of the reflection of the reflected portion of the machining beam that passes together with the reflected measurement beam to the deflection device can impinge on said photodiode. The output signal of the photodiode which determines a power value of a reflected portion of the machining beam can thereby be used to determine an actual time point of an impingement of the machining beam on the workpiece. In particular, the external signal is directly dependent on this actual time point.

It can further be provided according to the invention that the machining beam is projected and/or focused onto the workpiece by means of a movable machining beam optic, wherein the external signal is dependent on an actual movement of the machining beam optics. A time point of the start of machining can thereby accurately be determined independently of a control signal for moving a machining head, which can be subject to a temporal jitter relative to the measurement control signal. For example, a movement sensor can be provided, on the output signal of which movement sensor the external signal is based. The movement sensor can comprise, for example, a force sensor and/or an optical sensor.

According to a further development of the invention it is provided that a correspondingly trained neural network is used for processing the output signal of the photodiode which determines a power value of a reflected portion of the machining beam and/or of the photodiode which determines a power value of the machining beam, in order to allocate the various measurement points to the various machining time points. Alternatively or in addition, the neural network can take into consideration the analog feedback signal of the machining laser in the processing. Furthermore, the neural network can alternatively or in addition process an output signal of at least one sensor, in particular an output signal of the at least one sensor which is adapted to detect the pose of the wire relative to the workpiece. Alternatively or in addition, the neural network can further take into consideration in the processing a dependence on an actual movement of the machining beam optics. The neural network is in particular an artificial neural network. Depending on the application, the relationships between the determined power value of the machining beam and the determined power value of the reflected portion of the machining beam, for example, can be complex, for which reason it can be advantageous to train a neural network. This can take place with or without monitoring and/or using a corroborative training method. The neural network is thereby trained on a target range so that a state characterized by specific measured variables can be classified by the trained network. An adaptation to different systems, workpieces and components can thereby be made without relationships between different measured variables having to be known beforehand.

Reliable automated machining that has little susceptibility to defects can be made possible in particular when regulation of the penetration depth of the machining beam on the basis of the determined penetration depth and/or on the basis of the evaluation is provided. Monitoring of the machining process can comprise regulation of the penetration depth. The regulation can be carried out on the basis of the external signal, wherein said signal can, as described, be dependent on one or more different measured variables. The neural network can further be used as part of a regulator which is adapted to perform the regulation.

The subject-matter of the invention is not limited to the embodiments described hereinbefore. The embodiments and features described in connection with further developments of the invention can be combined as desired by a person skilled in the art without departing from the subject-matter of the invention as defined by the independent claims.

Preferred embodiments of the invention will be described in greater detail hereinbelow with reference to the accompanying schematic drawings, in which.

Figure 1:
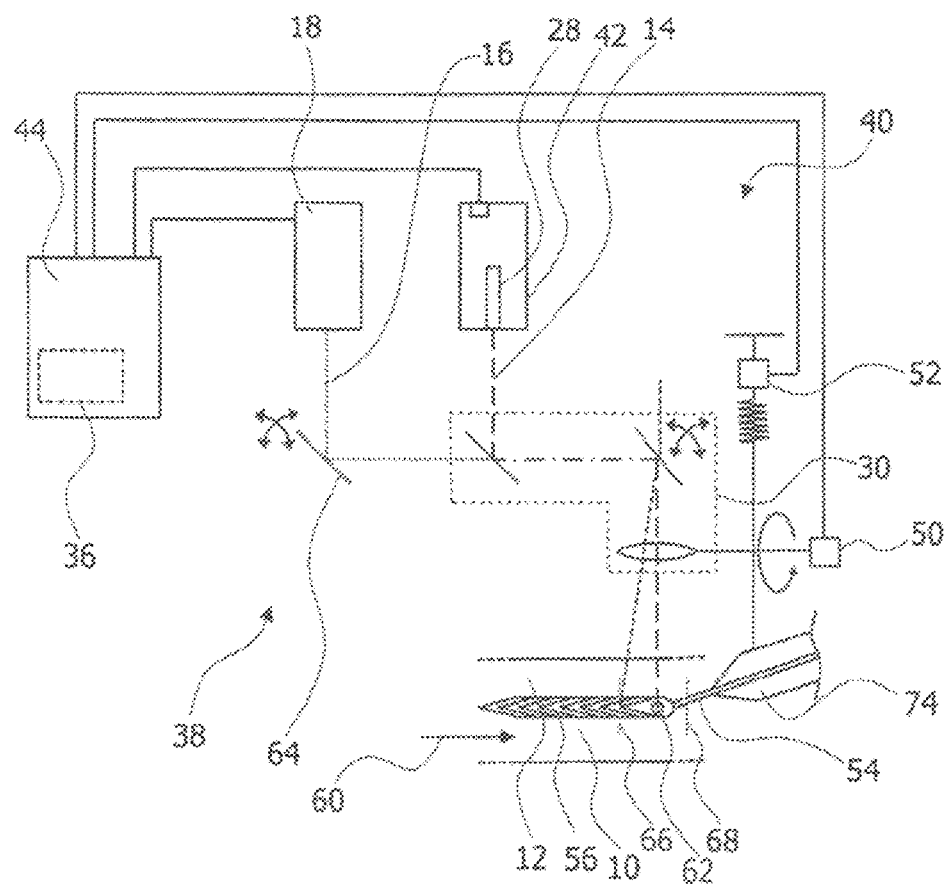
FIG. 1 shows a device according to the invention in a schematic representation.

FIG. 1 shows a possible embodiment of a device 38 according to the invention for conducting and monitoring a machining process of a workpiece 10. In the example shown, the machining process is a welding process for joining the workpiece 10 to a further workpiece 12.

The device 38 comprises a machining unit 40 having a machining beam source 42 for generating a high-energy machining beam 14. The machining beam source 42 in this exemplary embodiment comprises a machining laser 28, the laser beam of which forms the machining beam 14. The machining unit 40 further comprises machining beam optics 30 for projecting and focusing the machining beam 14 onto the workpiece 10 or onto the workpiece 12.

The machining beam optics 30 is arranged according to this embodiment on an industrial robot, not shown, by means of which the machining beam optics 30 is movable. The machining beam optics 30 additionally comprises suitably movable optical components such as, for example, a pivotable mirror by means of which a point of impingement of the machining beam 14 on the workpiece 10 or on the workpiece 12 can be changed.

The workpieces 10, 12 and the machining beam optics 30 are movable relative to one another, so that the workpieces 10, 12 can be machined along a specific trajectory, in the case shown along a weld seam 56. Machining accordingly takes place in a machining direction 60.

The device 38 additionally comprises an optical coherence tomograph 18 of conventional construction, which has a reference arm, not shown, and a measurement arm. The optical coherence tomograph 18 is adapted to generate a measurement beam 16, which is able to be coupled via a deflection device 64 and optionally further suitable optical components into the machining beam 14, or into the machining beam optics 30. The measurement arm thereby comprises an optical path which extends from the machining beam optics 30 to the workpiece 10 or to the workpiece 12. For generating the measurement beam 16, the coherence tomograph comprises a laser, not shown, that is to say the measurement beam 16 is a laser beam.

The deflection device 64 allows the measurement beam 16 to be deflected relative to the machining beam 14, so that the machining beam 14 and the measurement beam 16 can be directed at a common point of impingement or at different points of impingement in a machining region. This is illustrated in FIG. 1 by the representation of two possible paths of the measurement beam 16 starting from the machining beam optics 30. For example, the measurement beam 16 can be guided in front of a current machining region in the machining direction 60, in order to perform measurements on a surface of the workpieces 10, 12 to be machined. The measurement beam 16 can further be directed during machining into a keyhole 62 that is formed during machining. In the latter case, a penetration depth of the machining beam 14 can be measured.

The device 38 additionally has a control unit 44 which is connected to the various components of the device 38. The control unit 44 can be divided between different components and be formed as the combination of individual controllers.

The control unit 44 is adapted to generate a time-dependent measurement control signal and a time-dependent machining control signal. In accordance with the machining control signal, different machining regions of the workpiece are able to be machined at different machining time points. In addition, in accordance with the measurement control signal, different measurement points are able to be determined during the machining process by means of the optical coherence tomograph 18. Depending on the nature of the chosen data acquisition, these measurement points can comprise one or more space coordinates which indicate(s) a position on the workpiece 10, a position on the workpiece 12 and/or a position relative to a point of impingement of the machining beam and/or relative to a machining region. Alternatively or in addition, the measurement points can comprise a time coordinate. The measurement points further comprise a measurement distance value which in known manner is able to be determined by means of the optical coherence tomograph and is dependent on a length of the measurement arm.

The device 38 further has a wire feed 74 by means of which a wire 54 which is able to be melted can be fed during machining. The wire feed 74 is connected to the machining beam optics 30. For example, both the wire feed 74 and the machining beam optics 30 are part of the same machining head and are fastened to the same robot arm. The wire feed 74 is adapted to guide the wire 54 in a force-fitting manner onto a surface to be machined. Therefore, during the machining of the workpieces 10, 12, wire 54 which can be used to form the weld seam 56 is always available in the machining region. The wire feed 74 can be movable to a certain extent relative to the machining beam optics 30. The device 38 accordingly has a tactile welding optics.

Figure 2:
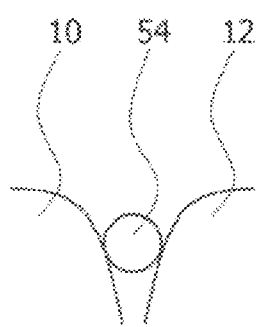
FIG. 2 is a schematic representation of two workpieces before they are joined.

The device 38 shown is suitable in particular for the welding of two workpieces 10, 12 located side by side, as are shown schematically in FIG. 1. Before the wire is melted, a situation as is illustrated in FIG. 2 arises in many cases. The wire 54 is thereby located at a specific depth between the two workpieces 10, 12, depending on the distance between them and the geometry of the edges thereof.

Figure 3:
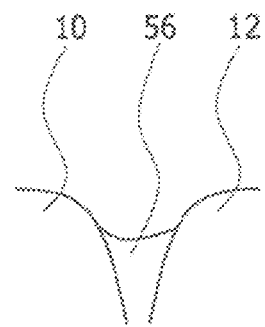
FIG. 3 is a schematic representation of the two workpieces after they have been joined.

After machining, the workpieces 10, 12 are joined by the material of the melted and then solidified wire 54, whereby a weld seam 56 is obtained, as is shown by way of example in FIG. 3.

Figure 4:
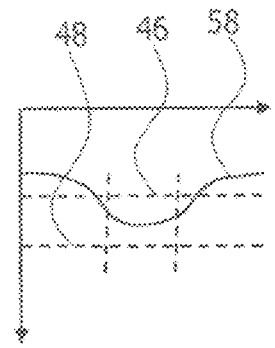
FIG. 4 is a schematic representation of a height profile of the two joined workpieces.

FIG. 4 shows in a schematic diagram a height profile 58 of the weld seam 56 and of portions of the workpieces 10, 12 adjoining the weld seam. A space coordinate is plotted on the horizontal axis of the diagram, and a height coordinate is plotted on the vertical axis.

Such a height profile 58 is determined by deflecting the measurement beam 16 transversely to the machining direction 60 along a measurement line 66 behind a current machining region in the machining direction. A plurality of measurement points is recorded along this measurement line 66 by means of the optical coherence tomograph 18 in accordance with corresponding measurement control signals. Furthermore, measurements can also be performed along a measurement line 68 which lies in front of a current machining region in the machining direction 60 and thus in a region of the workpieces 10, 12 that has not yet been machined.

The height profile 58 can be determined on the basis of the measurement points obtained along the measurement line 66, or the measurement distance values thereof. If workpieces are welded edge to edge in such a manner that flat surfaces of the workpieces lie next to the weld seam, a reference line can be obtained in edge regions of the height profile, the position of which reference line corresponds to a height position of the workpieces. Starting from a reference obtained in that manner, a target range can then be defined by an upper and/or a lower threshold. This can in turn be used in the machining for monitoring the machining process. If the height profile in a middle region, in which the weld seam is mapped, lies outside the target range, it can be concluded that the result of the machining is defective. The weld seam is in this case too high or too deep relative to the surfaces of the workpieces. The information contained in the height profile alone can thus be sufficient to monitor the machining process.

If, on the other hand, a situation as is illustrated in FIGS. 2 and 3 is present, the formation of such a reference is not possible because the course of the height profile in its edge regions cannot be approximated by a horizontal line. It is therefore not possible to conduct reliable monitoring on the basis of the height profile, either because the chosen target range would clearly be too wide or because, if a narrow target range were chosen, an error would occur owing to the edge regions of the height profile, since they would then lie outside the edge region. In both cases, reliable monitoring of the actual weld seam that is to be evaluated is not possible.

According to the invention it is therefore provided that the control unit 44 is adapted to obtain at least one external signal which is based on a measured variable and which is independent of a processing of the machining control signal and of the measurement control signal. The control unit is further adapted to generate an evaluation on the basis of the measurement points, which evaluation comprises a comparison of the measurement points with at least one threshold value, wherein the external signal is used for the evaluation. The machining process is then monitored on the basis of this evaluation. Thus, in addition to information from the OCT measured data, an external measured variable is additionally taken into consideration.

For the described case of the measurement of a height profile, the target range can be determined on the basis of the external signal. The described errors can thereby be avoided.

In the embodiment shown, the device 38 has a force sensor 50 for detecting a force acting on the wire 54. In the case shown, the force sensor 50 is adapted to detect twisting of the wire feed 74 or of the wire 54. The force sensor 50 can detect laterally acting forces and/or torsional forces for this purpose.

The device 38 further has a height sensor 52 which is able to detect a height position of the wire 54 or of the wire feed 74. On the basis of the output values of the force sensor 50 and of the height sensor 52 it is thus possible to reproduce the way in which the wire follows a surface morphology of the machined workpieces 10, 12 when it is guided in a force-fitting manner over the workpieces 10, 12.

With reference to FIG. 4, the control unit 44 is adapted to determine an upper threshold 46 and a lower threshold 48 for the height profile 58 as the threshold value, on the basis of the output values of the force sensor 50 and of the height sensor 52. The upper threshold 46 and the lower threshold 48 are accordingly not merely derived from the height profile 58 itself but are based on at least one external signal which comprises output values of at least one sensor. The monitoring then includes a comparison of the height profile 58 with the upper threshold 46 and the lower threshold 48.

Furthermore, the region in which, that is to say the space coordinates for which, the comparison of the height profile with the threshold value is to take place is specified on the basis of the external signal. This is represented in FIG. 4 by the two vertical broken lines. A target range for the height profile 58 is thus determined jointly by the upper threshold 46 and the lower threshold 48. In the case shown, the height profile 58 lies within the target range, although it extends above the upper threshold 46 in the edge regions. Only the course of the height profile in the middle region is important here for the evaluation. Since the height profile 58 lies within the target range in that region, the monitoring does not deliver a defect message.

Alternatively or in addition, it is also possible to define a target range whose thresholds are adapted to the curved profile of the workpiece surfaces.

It will be appreciated that it is also possible for only one of the two sensors 50, 52 to be present. Likewise, other sensors can be used to provide the required information in the form of an external signal.

Figure 5:
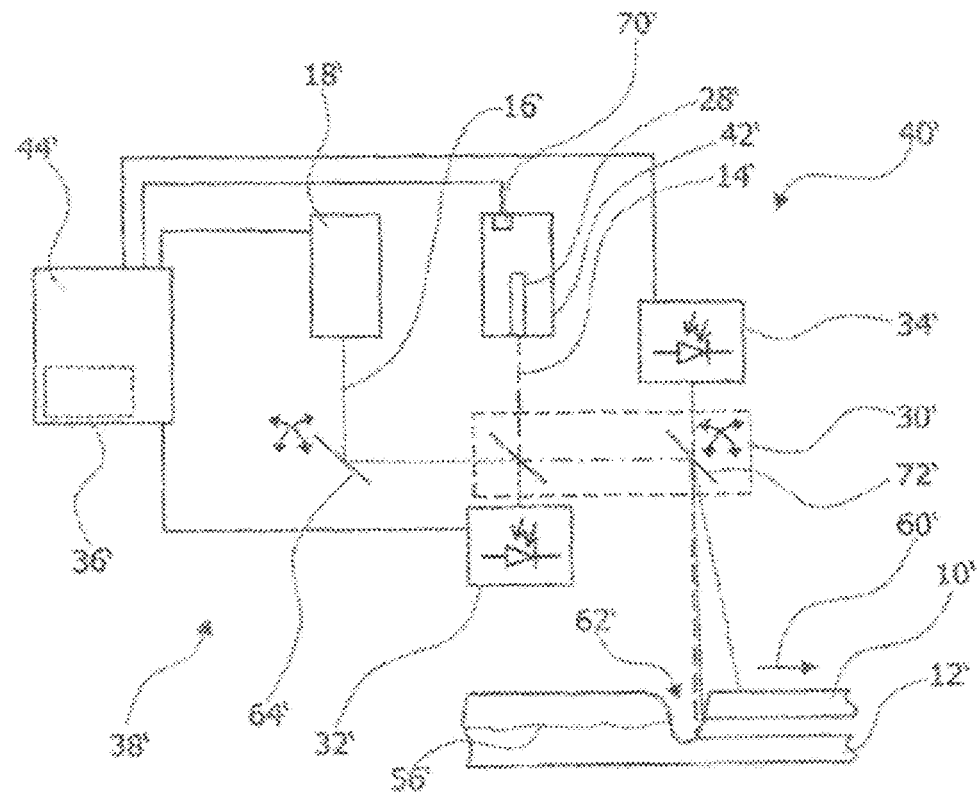
FIG. 5 shows an alternative embodiment of a device according to the invention in a schematic representation.

FIG. 5 shows an alternative embodiment of a device 38' according to the invention in a schematic representation. For this exemplary embodiment, reference numerals provided with primes are used. Elements having the same function are provided with the same reference numerals as used in the above remarks. Reference will therefore be made hereinbelow to the above remarks, and only the additional or alternative elements will be described.

A typical application of the alternative device 38' is in the welding of two workpieces 10', 12' located one above the other. In FIG. 5, a gap is shown between the workpieces 10', 12' in front of a keyhole 62' in the machining direction 60'. Such a gap can occur in practice as a result of slight irregularities in the workpieces. Furthermore, the workpieces 10', 12' are often comparatively thin metal sheets, wherein, for example, the underside of the lower workpiece 12' can be provided with an anti-corrosion layer or the like, for example with a zinc layer. In such a case, the machining beam 14' should be prevented from passing through the second workpiece 12' completely, since the anti-corrosion layer will otherwise be damaged. On the other hand, reliable joining of the two workpieces 10', 12' requires the machining beam 14' to penetrate sufficiently far into both workpieces 10', 12' that the melt that forms extends over both workpieces 10', 12' and optionally over the gap. Monitoring of the penetration depth can therefore be of central importance when conducting a machining process.

Figure 6:
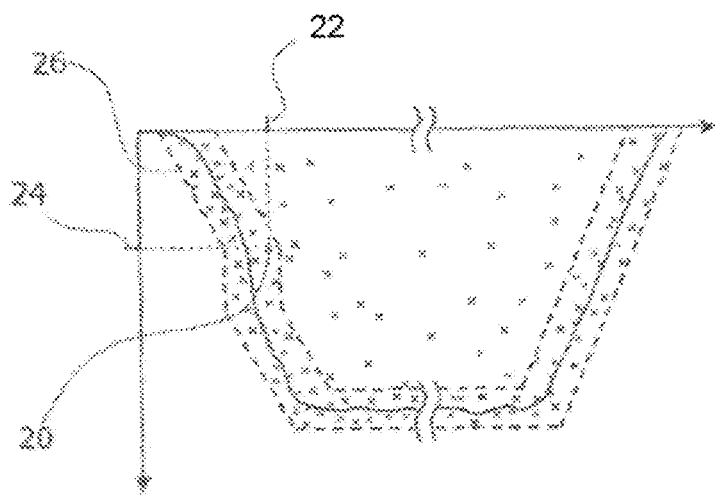
FIG. 6 is a schematic diagram of a variation with time of measurement distance values.

Reference will additionally be made hereinbelow to FIG. 6. FIG. 6 shows a schematic diagram of a variation with time of measurement distance values, wherein the time is plotted on the horizontal axis and the penetration depth on the vertical axis. With reference to the above remarks, the penetration depth in the keyhole 62' can be measured. The inventors have recognized that the measurement beam 16' can be aligned with the machining beam 14' particularly easily when a hole is first made in a piece of aluminum foil or another metal by means of the machining beam 14' and the hole is then measured by means of the measurement beam 16'.

For the recording of data, as are shown in FIG. 6, measurement points 20' are obtained by means of the coherence tomograph 18', each of which measurement points has a measurement time point 22' and a measurement distance value 24'. The penetration depth can be determined from the measurement distance value 24' on the basis of suitable reference measurements. For example, a reference measurement can be made at a surface of the workpiece 10' before machining starts. Alternatively or in addition, the measurement beam 16' can temporarily be deflected, for example laterally, out of the keyhole 62' during machining, in order to acquire reference distance values at regular intervals.

For the sake of clarity, only one measurement point 20' is provided with a reference numeral in FIG. 6. As is shown schematically, a scatter plot of measurement points is obtained over time after the machining beam 14' has been switched on. While the measurement points with the greatest distance values correspond to the current actual penetration depth of the machining beam 14', measurement points with smaller distance values also occur, for example as a result of reflections at lateral faces of the keyhole 62'. A variation of the penetration depth is shown in FIG. 6' by the solid line. In order to determine the penetration depth and the variation thereof and optionally to monitor a deviation from a target value, an envelope curve 26' is laid over the scatter plot. The course of the boundaries of this envelope curve 26' can also take account of the presence of a gap between the workpieces 10', 12'. The envelope curve 26' makes it possible, for example, when determining the penetration depth, to disregard measurement points which are due to reflections and are not ascribed to the actual penetration depth. For this purpose, a vertical course is provided in the present case in the boundaries of the envelope curve 26' in some regions (see left-hand half of the envelope curve 26'), within which the distance measurement values change suddenly because the penetration depth likewise increases suddenly when the gap is reached.

It has been described above that the measurement points 20' are determined in accordance with a time-dependent measurement control signal, whereas the machining is carried out in accordance with a time-dependent machining control signal. Both control signals are generated by the control unit 44', whereby the temporal jitter mentioned hereinbefore can occur. The measurement points 20' are therefore to be associated on the basis of the control signals at the maximum with a temporal accuracy which corresponds to the jitter. This accuracy is in the region of milliseconds. The period of time from switching on of the machining beam 14' to the achievement of the maximum desired penetration depth is likewise a few milliseconds and is at best slightly longer, depending on the material, power, process conditions, etc. Since the envelope curve 26' is positioned on the basis of the machining control signal, in order to take into consideration the start of machining, it can happen, on account of this temporal jitter, that the envelope curve 26' and the measuring points 20' are temporally not correctly allocated to one another. If a target range for the variation of the penetration depth in accordance with the envelope curve 26 is used, defects may under some circumstances not be detected and/or states that are actually defect-free may be evaluated as defective.

According to the invention, the control unit 44' is therefore adapted to obtain an external signal which is based on a measured variable and which is independent of a processing of the machining control signal and of the measurement control signal. On the basis of the external signal, actual machining time points can be determined. In accordance with this external signal, different measurement points are then allocated to different machining time points. The penetration depth can then be determined on the basis of this allocation. As a result, the measurement points 20' are no longer allocated to measurement time points that are affected by jitter, but are allocated to actual machining time points. As a result, the envelope curve 26' can be laid more accurately over the measurement points 20'.

In the exemplary embodiment shown, the external signal can come from different sources. Depending on the operating mode, individual, some or all of these sources can be used. It will be appreciated, however, that in alternative embodiments, individual or all but one of these sources can be omitted.

Specifically, the control unit 44' in the present case is adapted to process an analog feedback signal of the machining laser 28' as the external signal. The control unit 44' obtains that signal via a terminal 70' of the machining laser 28'. The analog feedback signal comes, for example, from an internal photodiode of the machining laser 28', on the basis of which a time point of switching on of the machining beam 14' can be determined with an accuracy of less than one millisecond or, depending on the specification, of a few microseconds. Moreover, a power of the machining laser 28 can be determined on the basis of this feedback signal.

The device 38' shown further comprises a first photodiode 32' which determines a power value of the machining beam. The first photodiode 32' is arranged behind a partially transmitting optical element of the machining beam optics 30', preferably behind a semi-reflecting mirror at the exit of the machining beam source 42'. A portion of the machining beam 14, after it has been switched on, accordingly falls directly on the first photodiode 32, whereby the time point of switching on can be determined on the basis of the output signal of the first photodiode 32. The external signal can comprise this output signal.

The device 38' shown further comprises a second photodiode 34' which determines a power value of a reflected portion of the machining beam 14'. The second photodiode 34' is arranged behind a partially transmitting optical element of the machining beam optics 30', preferably behind a semi-reflecting mirror at the exit of the machining beam optics 30', such as, for example, behind a machining scanner 72'. A portion of the machining beam 14', after it has been reflected at the workpiece 10', accordingly falls, as it returns into the machining beam optics 30', on the second photodiode 34', whereby the time point from which power is coupled into the workpiece 10' can be determined on the basis of the output signal of the second photodiode 34'. The external signal can comprise this output signal.

In addition, it can be provided according to a variant of the invention that the external signal is dependent on an actual movement of the machining beam optics 30' and/or of the machining scanner 72'. The device 38 can have for this purpose a movement sensor, not shown. As a result, it can be determined, on the basis of the external signal, from when the machining beam 16 is directed at a new machining region. Alternatively or in addition, an external signal in respect of the movement of the machining beam optics 30' and/or of the machining scanner 72' can be determined on the basis of the output signals of the two photodiodes 30', 32'. Since the power of the portion of the machining beam 14' that falls on the photodiode 32' is independent of the point of impingement of the machining beam 14' on the workpiece 10', but the power of the portion of the machining beam 14' that falls on the photodiode 34' is dependent on a position of the machining beam optics 30' and a point of impingement of the machining beam 14' on the workpiece 10', it is possible to conclude from a comparison of the two output signals of the photodiodes 32', 34' whether a change in the signals is caused by the machining beam 14' being switched on or off or by the displacement thereof.

In some embodiments of the invention, the device 38' can have a neural network 36' which is used, for example, for processing the output signals of the photodiodes 32', 34' in order to allocate the various measurement points 20' to various machining time points. The neural network 36' is first trained by feeding thereto the above-described external signal, which can come from the mentioned different sources, for different states of the device 38'. For this purpose, the power of the machining beam 14', the position of the machining beam 14' relative to a test workpiece, a state of the machining beam optic, materials of different test workpieces, surfaces of different test workpieces and other parameters, for example, are suitably varied in order to produce different states, wherein in each case a penetration depth is determined. Information relating to these different states is thereby stored in the neural network 36'. The trained neural network 36' is then able to classify states that occur during an actual machining process and take the corresponding classification into consideration in the determination of the penetration depth on the basis of the external signal.

Some or all of the described approaches for the temporal allocation of measurement points to the machining time points can of course also be used in the case of machining by means of the device 38 of the first embodiment and the tactile welding optics thereof. These can correspondingly have one or more additional photodiodes and/or additional sensors. The use of the analog feedback signal of the machining laser 28 is also possible in an analogous manner. On the one hand, penetration of the machining beam 14 can likewise be observed more accurately as a result, and on the other hand the penetration depth can also be monitored more accurately while machining is being carried out, if the temporal allocation is subject to a reduced temporal jitter.

Figure 7:
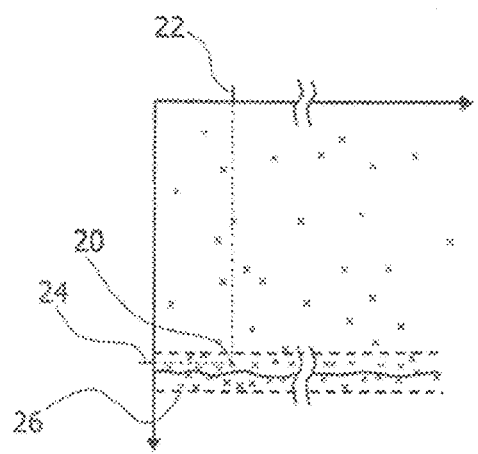
FIG. 7 is a schematic diagram of a further variation with time of measurement distance values.

While the device 38 of the first embodiment is operating, measurement points 20 as shown in FIG. 7 can accordingly be obtained. Here too, a temporal allocation has taken place. Using an envelope curve 26, an instantaneous penetration depth, or the variation with time thereof, can be observed, which is illustrated by the solid line. This can take place in addition to the determination of height profiles of the weld seam 56 by guiding the measurement beam 16 into the keyhole 62 at specific times and along a measurement line 66 at specific times.

Figure 8:
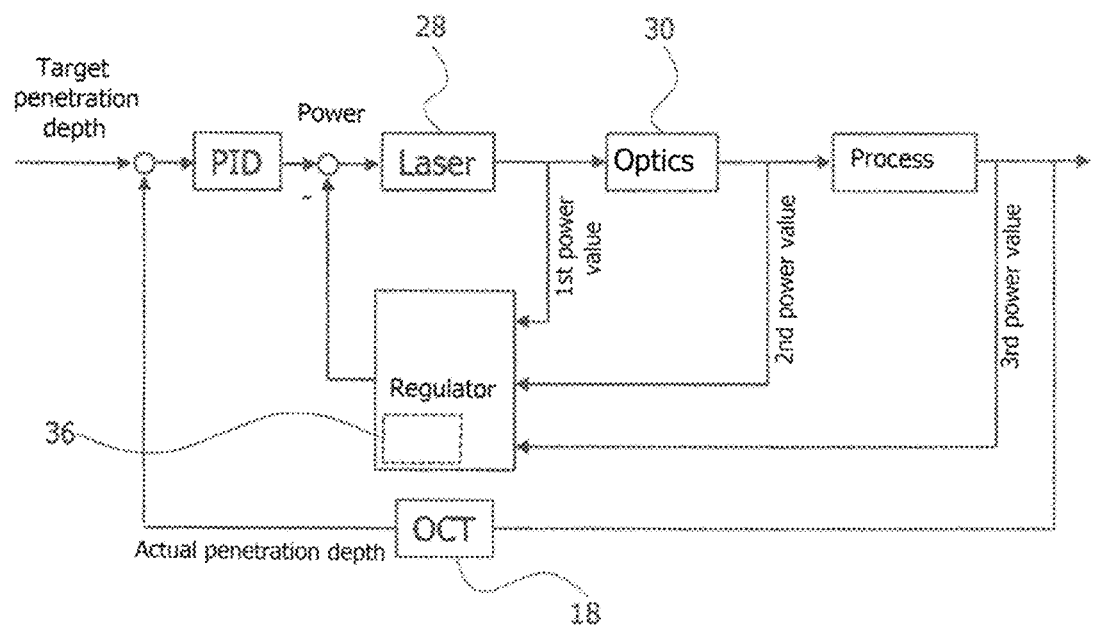
FIG. 8 is a schematic representation of a regulation circuit as can be used in the device.

As is illustrated with reference to the regulation circuit shown in FIG. 8, it can also be provided in some variants of the invention that the penetration depth of the machining beam 14 is regulated on the basis of the determined penetration depth. To this end, a target penetration depth is defined, which is compared with an actual penetration depth. This actual penetration depth is obtained, as described, on the basis of the external signal and is therefore based on temporally newly allocated measurement points. The control variable in the case shown is the power of the machining beam source 40. In the example shown, a regulator, which can be provided, for example, in the control unit 44, takes into consideration the analog feedback signal of the machining laser as a first power value, the output signal of the first photodiode as a second power value, and the output signal of the second photodiode as a third power value.

Alternatively or in addition, an external signal that is associated with a movement of the machining beam optics 30 and/or of the machining scanner 72 can also be taken into consideration.

In addition, it can be provided according to other embodiments that only the analog feedback signal, only the output signal of the first photodiode, only the output signal of the second photodiode or any desired combinations of the mentioned signals are used.

Moreover, alternatively or in addition, the output signals of the force sensor 50 and of the height sensor 52 can be taken into consideration in the regulation. In particular, the power of the machining beam 14, a contact force of the wire 54, a feed speed of the wire 54, a focal point of the machining beam 14 and the like can serve as control variables for reducing a deviation of the measured actual height profile from a target height profile.

Figure 9:
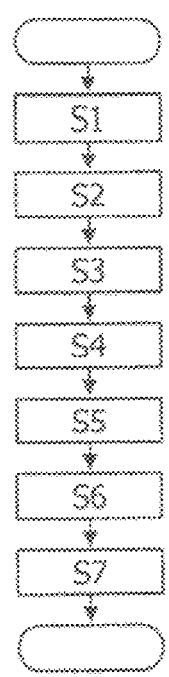
FIG. 9 is a schematic flow diagram of a method according to the invention.

FIG. 9 shows a schematic flow diagram of a method according to the invention for conducting and monitoring a machining process of a workpiece 10. The method is conducted, for example, with the above-described device 38.

A first step S1 comprises generating a high-energy machining beam 14.

A second step S2 comprises projecting and/or focusing the machining beam 14 onto the workpiece 10, wherein, in accordance with a machining control signal, different machining regions of the workpiece 10 are machined.

A third step S3 comprises generating a measurement beam 16 by means of an optical coherence tomograph 18, wherein the measurement beam 16 is able to be coupled into the machining beam 14.

A fourth step S4 comprises determining measurement points 20 during the machining process by means of the optical coherence tomograph 18 using the measurement beam 16 in accordance with a measurement control signal.

A fifth step S5 comprises obtaining an external signal which is based on a measured variable and which is independent of a processing of the machining control signal and of the measurement control signal.

A sixth step S6 comprises generating an evaluation on the basis of the measurement points 20 and of the at least one external signal, which evaluation comprises a comparison of the measurement points 20 with at least one threshold value.

A seventh step S7 comprises monitoring the machining process on the basis of the evaluation.

The method can comprise further steps which are directed at implementing the above-described functionalities of the device 38 and in particular of the control unit 44.

The invention claimed is:

1. A method for conducting and monitoring a welding process for joining the workpiece to a further workpiece, by means of a high-energy machining beam, wherein the method comprises the following steps:
   generating a high-energy machining beam using a machining beam source of a machining unit;
   projecting or focusing the machining beam onto the workpiece using machining beam optics of the machining unit, wherein, in accordance with a machining control signal generated by a control unit, different machining regions of the workpiece are machined;
   generating a measurement beam using an optical coherence tomograph, wherein the measurement beam is able to be coupled into the machining beam;
   determining measurement points during the machining process using the measurement beam, in accordance with a measurement control signal generated by the control unit, wherein the measurement points comprise one or more space coordinates which indicate at least one of a position on the workpiece, a position on the further workpiece, a position relative to a point of impingement of the machining beam, and a position relative to a machining region;
   generating at least one external signal using at least one sensor, wherein the at least one sensor comprises at least one photodiode, wherein the at least one photodiode determines (i) a power of the machining beam in a region of the machining beam optics and (ii) a power value of a reflected portion of the machining beam obtaining the at least one external signal as a measured variable, wherein the measured variable that is dependent on a physical operation and is independent of a processing of the machining control signal and of the measurement control signal;
   generating an evaluation on the basis of the measurement points and of the at least one external signal, which evaluation comprises a comparison of the measurement points with at least one threshold value; and
   monitoring the machining process on the basis of the evaluation.

2. The method as claimed in claim 1, wherein the at least one external signal comprises output values of the at least one sensor.

3. The method as claimed in claim 2, wherein a wire which is able to be melted by means of the machining beam during the machining is fed in the machining region, and wherein the at least one sensor is adapted to detect a pose of the wire relative to the workpiece.

4. The method as claimed in claim 3, wherein the at least one sensor comprises a force sensor for detecting a force acting on the wire or a height sensor for detecting a height position of the wire.

5. The method as claimed in claim 1, wherein a weld seam is formed by the machining beam, and wherein the measurement points map a height profile of the weld seam after it has been formed.

6. The method as claimed in claim 5, wherein the height profile is obtained in a direction transverse to a machining direction by lateral deflection of the measurement beam.

7. The method as claimed in claim 5, wherein, on the basis of the output values of the at least one sensor, an upper or a lower threshold for the height profile is determined as the at least one threshold value, and wherein the monitoring comprises a comparison of the height profile with the upper or with the lower threshold.

8. The method as claimed in claim 1, wherein the at least one threshold value comprises an envelope curve, and wherein the monitoring comprises a comparison of the measurement points with the envelope curve.

9. The method as claimed in claim 1, wherein the at least one external signal comprises an analog feedback signal of the machining laser.

10. The method as claimed in claim 1, wherein the machining beam is projected or focused by a machining beam optics, wherein the at least one external signal comprises an output signal of a photodiode which determines a power of the machining beam in a region of the machining beam optics.

11. The method as claimed in claim 1, wherein the at least one external signal comprises an output signal of a photodiode which determines a power value of a reflected portion of the machining beam.

12. A device for conducting and monitoring a welding process for joining the workpiece to a further workpiece, configured to perform the method as claimed in claim 1.

13. A device for conducting and monitoring a welding process for joining the workpiece to a further workpiece, by means of a high-energy machining beam, wherein the device comprises:
- a control unit;
- a machining unit having a machining beam source for generating the high-energy machining beam and having machining beam optics for projecting or focusing the machining beam onto the workpiece, wherein, in accordance with a machining control signal generated by the control unit, different machining regions of the workpiece are able to be machined;
- an optical coherence tomograph for generating a measurement beam, wherein the measurement beam is able to be coupled into the machining beam; and
- at least one sensor is configured for determining a power of the machining beam in a region of the machining beam optics and generating at least one external signal;
- wherein the control unit is adapted to:
  - determine measurement points during the machining process using the measurement beam, in accordance with a measurement control signal generated by the control unit, wherein the measurement points comprise one or more space coordinates which indicate at least one of a position on the workpiece, a position on the further workpiece, a position relative to a point of impingement of the machining beam, and a position relative to a machining region;
  - obtain at least one external signal as a measured variable from the at least one sensor, wherein the measured variable is dependent on a physical operation and is independent of a processing of the machining control signal and of the measurement control signal;
  - generate an evaluation on the basis of the measurement points and of the at least one external signal, which evaluation comprises a comparison of the measurement points with at least one threshold value; and
  - monitor the machining process on the basis of the evaluation.

14. The device as claimed in claim 13, wherein the at least one sensor comprises at least one selected from the group comprising a force sensor and a height sensor.

15. The device as claimed in claim 13, wherein the measurement points map a height profile of the weld seam after it has been formed.

16. The device as claimed in claim 15, wherein the height profile is obtained in a direction transverse to a machining direction by lateral deflection of the measurement beam.

17. The device as claimed in claim 15 wherein, on the basis of the output values of the at least one sensor, the control unit is adapted to determine an upper or a lower threshold for the height profile as the at least one threshold value, and wherein monitoring by the control unit comprises a comparison of the height profile with the upper or with the lower threshold.

18. The device as claimed in claim 13, wherein the at least one threshold value comprises an envelope curve, and wherein monitoring by the control unit comprises a comparison of the measurement points with the envelope curve.

19. The device as claimed in claim 13, wherein the machining beam is generated by the machining beam source, and wherein the at least one external signal comprises an analog feedback signal of the machining beam source.

20. The device as claimed in claim 13, further comprising a photodiode, wherein the machining beam is projected or focused by the machining beam optics, wherein the at least one external signal comprises an output signal of the photodiode which determines a power of the machining beam in a region of the machining beam optics.

21. The device as claimed in claim 13, further comprising a photodiode, wherein the at least one external signal comprises an output signal of the photodiode which determines a power value of a reflected portion of the machining beam.

22. A device for conducting and monitoring a welding process for joining the workpiece to a further workpiece, by means of a high-energy machining beam, wherein the device comprises:
- a control unit;
- a machining unit having a machining beam source for generating the high-energy machining beam and having machining beam optics for projecting or focusing the machining beam onto the workpiece, wherein, in accordance with a machining control signal generated by the control unit, different machining regions of the workpiece are able to be machined, wherein the machining beam is projected or focused by the machining beam optics;
- at least one sensor for generating at least one external signal, wherein the at least one sensor comprises at least one photodiode, wherein the at least one photodiode determines at least one selected from the group consisting of (i) a power of the machining beam in a region of the machining beam optics and (ii) a power value of a reflected portion of the machining beam; and an optical coherence tomograph for generating a measurement beam, wherein the measurement beam is able to be coupled into the machining beam;

wherein the control unit is adapted to:
- determine measurement points during the machining process using the measurement beam, in accordance with a measurement control signal generated by the control unit, wherein the measurement points comprise one or more space coordinates which indicate at least one of a position on the workpiece, a position on the further workpiece, a position relative to a point of impingement of the machining beam, and a position relative to a machining region;
- obtain at least one external signal as a measured variable from the at least one sensor, wherein the measured variable is dependent on a physical operation and is independent of a processing of the machining control signal and of the measurement control signal;
- generate an evaluation on the basis of the measurement points and of the at least one external signal, which evaluation comprises a comparison of the measurement points with at least one threshold value; and
- monitor the machining process on the basis of the evaluation.

* * * * *